(12) United States Patent
Dill

(10) Patent No.: US 6,715,832 B2
(45) Date of Patent: Apr. 6, 2004

(54) GEARED FITTING FOR A VEHICLE SEAT ADJUSTER

(75) Inventor: Thomas Dill, Kaiserslautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/134,062

(22) Filed: Apr. 26, 2002

(65) Prior Publication Data
US 2002/0167210 A1 Nov. 14, 2002

(30) Foreign Application Priority Data
Apr. 27, 2001 (DE) .......................... 101 20 854

(51) Int. Cl.[7] .............................. A47C 1/02; B60N 2/02; B60N 2/42
(52) U.S. Cl. .................... 297/313; 297/362; 297/361.1; 297/354.2; 297/216.1; 475/162
(58) Field of Search .............................. 297/362, 361.1, 297/354.12, 313, 216.1; 384/275; 475/176, 346, 162, 347, 331

(56) References Cited

U.S. PATENT DOCUMENTS

| | | | | |
|---|---|---|---|---|
| 4,196,931 A | * | 4/1980 | Werner | 297/362 |
| 4,781,416 A | * | 11/1988 | Johnson et al. | 297/362 |
| 4,832,405 A | * | 5/1989 | Werner et al. | 297/362 |
| 4,836,607 A | * | 6/1989 | Kluting | 297/354.12 |
| 4,943,116 A | * | 7/1990 | Ohwada et al. | 297/362 |
| 5,096,261 A | * | 3/1992 | Baloche | 297/362 |
| 5,104,190 A | * | 4/1992 | Siegrist | 297/362 |
| 5,277,672 A | * | 1/1994 | Droulon et al. | 475/176 |
| 5,452,938 A | * | 9/1995 | Ernst | 297/362 |
| 5,524,970 A | * | 6/1996 | Kienke et al. | 297/362 |
| 5,536,217 A | * | 7/1996 | Droulon et al. | 475/177 |
| 5,542,772 A | * | 8/1996 | Reuber et al. | 403/97 |
| 5,871,414 A | * | 2/1999 | Voss et al. | 475/175 |
| 6,158,811 A | | 12/2000 | Hofschulte et al. | |
| 6,305,748 B1 | * | 10/2001 | Ohba | 297/362 |
| 6,460,819 B1 | * | 10/2002 | Muhlberger et al. | 248/421 |

FOREIGN PATENT DOCUMENTS

| | | |
|---|---|---|
| DE | 196 41 372 A1 | 4/1998 |
| DE | 199 42 975 C1 | 11/2000 |

OTHER PUBLICATIONS

U.S. patent application No. 09/658,151; filed Sep. 8, 2000; Inventors: Muhlberger et al.; entitled *Automobile Seat With Inclination Adjuster*.

* cited by examiner

*Primary Examiner*—Peter M. Cuomo
*Assistant Examiner*—Sarah C. Burnham
(74) *Attorney, Agent, or Firm*—Alston & Bird LLP

(57) ABSTRACT

In the case of a geared fitting (1) for a vehicle seat adjuster, having a first internal-geared wheel (11) and a second internal-geared wheel (22) which is mounted rotatably relative to the first one and is arranged axially thereto, as central gear wheels, and having at least one revolving planet wheel (18) which is arranged axially between the internal-geared wheels (11, 22) and is in engagement with the two internal-geared wheels (11, 22), the second internal-geared wheel (22) is mounted on the first internal-geared wheel (11) with an undulating and/or polygonal bearing bushing (21) positioned between the internal-geared wheels.

22 Claims, 3 Drawing Sheets

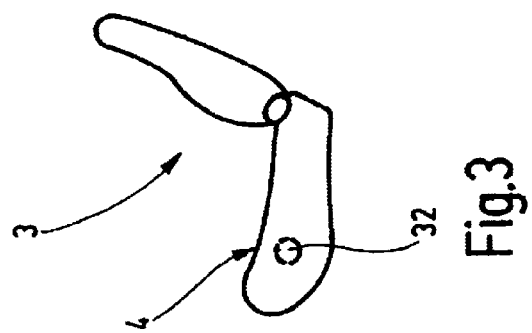
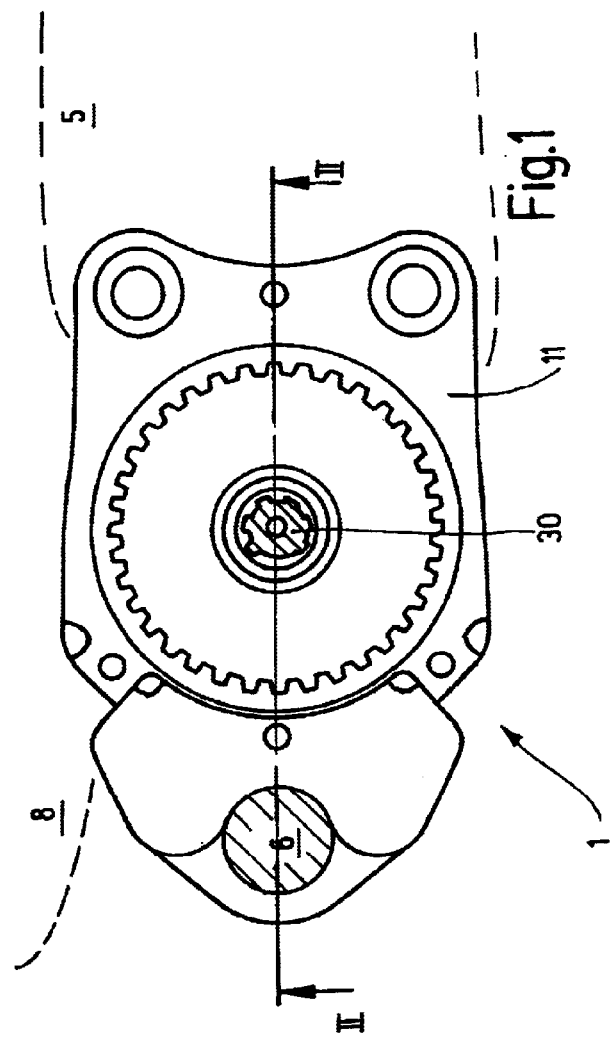
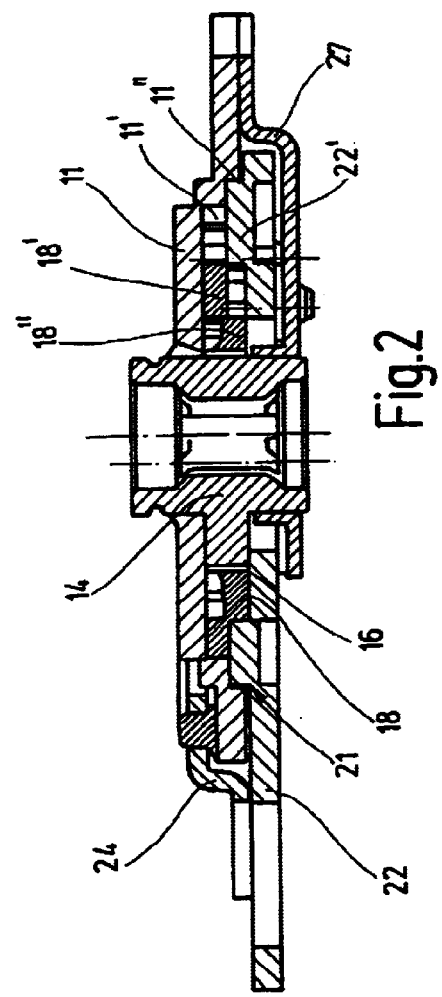

GEARED FITTING FOR A VEHICLE SEAT ADJUSTER

BACKGROUND OF THE INVENTION

The present invention relates to a geared fitting for a vehicle seat adjuster.

A closed planet gear can be used as a drive for an adjuster of a vehicle seat, with an unactuated gear acting as a block for restricting motion in some circumstances. Production-induced tolerances of the components may lead to a clearance at the output. When the gear is blocked, this clearance may cause noises and undesirable movements in the traveling mode.

BRIEF SUMMARY OF THE INVENTION

One aspect of the present invention is the provision of an improved geared fitting for a vehicle seat adjuster. In accordance with this aspect, a geared fitting for a vehicle seat adjuster includes central gear wheels including a first internal-geared wheel and a second internal-geared wheel. The first internal-geared wheel extends at least partially around an axis of the geared fitting. The second internal-geared wheel is mounted on the first internal-geared wheel by a bearing bushing that is positioned between the first and second internal-geared wheels, so that the second internal-geared wheel extends at least partially around the axis and is capable of rotating relative to the first internal-geared wheel. In accordance with this aspect, the bearing bushing is an undulating and/or polygonal bearing bushing. Also in accordance with this aspect, at least one revolving planet wheel is positioned between and in engagement with the first and second internal-geared wheels. In accordance with one aspect of the present invention, this type of geared fitting is included in the seat adjuster of a vehicle seat.

By mounting the second internal-geared wheel on the first internal-geared wheel with an undulating and/or polygonal bearing bushing positioned in between, a simple mounting is achieved which has a means which can compensate for production-induced tolerances, in particular a radial bearing clearance. An undulating or wavy bearing bushing is intended to be understood to be a bearing bushing which is of approximately cylindrical design and has a radius which fluctuates, preferably uniformly, along the circumferential direction. A polygonal bearing bushing is to be understood to be a bearing bushing which is likewise of approximately cylindrical design, but has a polygonal shape in cross section. Apart from purely convex structures, the polygonal shape is intended also to comprise other angular structures, meanders and mixed shapes having corners, curved and/or flat surfaces. The reduction of the bearing clearance between the two internal-geared wheels prevents the planet wheel from being able to migrate radially out of the toothing and a considerable twisting backlash, i.e. a loss in overlap, from being produced. In addition, rattling noises are avoided.

In one preferred embodiment, the bearing bushing has, as the means compensating for the bearing clearance, a body which extends in the axial direction, and can preferably be deformed and preferably bears at least partially against the internal-geared wheels with line contact. A line bearing of this type is achieved, for example, by the cross section of the body having a polygonal or wavy shape which is preferably regular and has inscribed outer and inner circles. The body then bears against cylindrical bearing surfaces of the two internal-geared wheels at its corners/edges or wave peaks and at its side centers or wave troughs, the preferably elastic deformability building up a prestress which eliminates the bearing clearance. Preferably the inner and outer polygonal and/or indulating shapes, which are preferably defined by inner and outer surfaces of the generally annular body of the bearing bushing, extend completely around the inner and outer circumferences of the body.

The bearing bushing can have the cross section mentioned over its entire axial length, which is particularly favorable for the build up of the prestress, or can additionally have a region which acts as a defined, axial spacer between the internal-geared wheels.

The geared fitting according to the invention is preferably used in a vehicle seat, in particular in a motor vehicle seat, for example in an inclination adjuster for the entire seat surface (seat shell) or for part of the seat surface, for the backrest and/or the head restraint, or in a height adjuster, in particular at points at which forces occur.

BRIEF DESCRIPTION OF THE DRAWINGS

Figure 4:
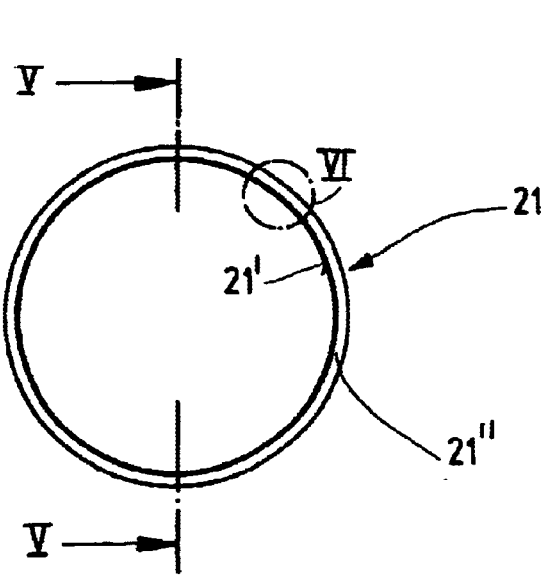
Figure 5:
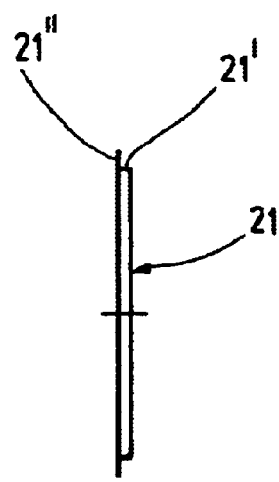
Figure 6:
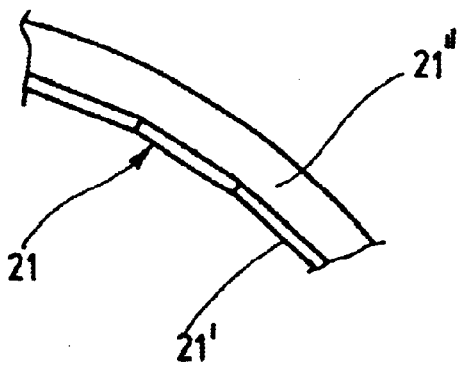
Figure 7:
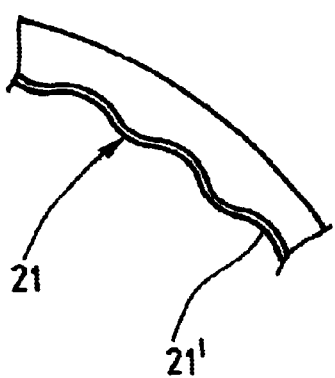
Figure 8:
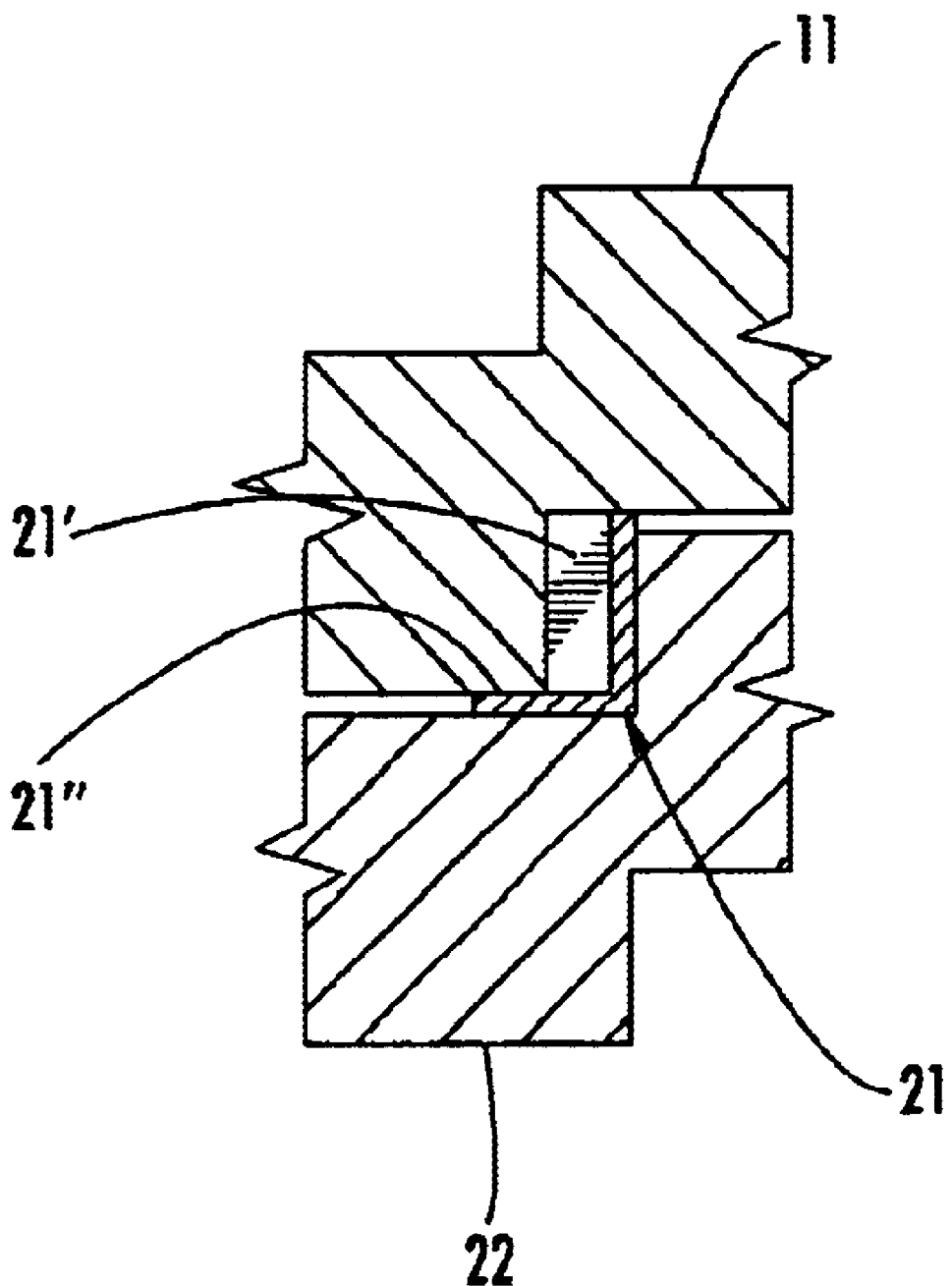

Having thus described the invention in general terms, reference will now be made to the accompanying drawings, which illustrate an exemplary embodiment of the present invention, and wherein:

FIG. 1 shows a partially cut away side view of the exemplary embodiment,

FIG. 2 shows a horizontal section along the line II—II in FIG. 1,

FIG. 3 shows a schematic side view of a vehicle seat equipped according to the invention, FIG. 4 shows an axial view of a bearing bushing, FIG. 5 shows a cross section through the bearing bushing along the line V—V in FIG. 4, FIG. 6 shows a cutout of the bearing bushing in the region VI in FIG. 4, FIG. 7 shows a cutout of the bearing bushing in the region VI in FIG. 4, wherein the bearing bushing defines undulating bearing surfaces in accordance with one example of another embodiment of the present invention, and FIG. 8 is a schematic enlarged view of a portion of the section illustrated in FIG. 2.

DETAILED DESCRIPTION OF THE INVENTION

The present invention now will be described more fully hereinafter with reference to the accompanying drawings, in which exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the exemplary embodiment, a geared fitting 1, which is generally designed as a simple, returning planet gear, is provided in a vehicle seat 3 for an inclination adjuster 4 of the seat surface. During the installation into a seat frame of the vehicle seat 3, the geared fitting 1 is fastened on one of the two sides of the vehicle seat 3 at the front end of a seat frame 5, with the pivot axis of the geared fitting 1 being arranged horizontally. At the output end, a horizontal rod 6, on which the front edge of a seat shell 8 is mounted, is fitted on the geared fitting 1, in alignment with a hinge on the other side of the vehicle seat 3. Actuation of the geared fitting 1 causes it to pivot, with the result that the inclination of the seat shell 8 can be adjusted relative to the vehicle seat 3. The geared fitting 1 blocks/restricts movement when not actuated, with the result that the inclination which has been set is retained.

For fastening to the seat frame 5, the geared fitting 1 has a first, fixed internal-gear wheel 11 whose internal toothing, which acts as a central gear wheel, points in the axial direction toward the inside of the vehicle seat 3 when the geared fitting 1 is installed. An eccentric 14 is mounted rotatably in a central hole in the fixed internal-geared wheel 11, a pinion 18 being mounted on the circumferential surface of said eccentric in a rotationally fixed manner by means of a sleeve 16. The pinion 18, which is provided as a planet wheel, has two axial sections of different diameter having a correspondingly different external toothing. The first section 18' which faces the fixed internal-geared wheel 11 and has a larger diameter is arranged entirely in the fixed internal-geared wheel 11, in a depression 11' defined by the internal toothing thereof, and is in toothed engagement with this internal toothing and can run along it.

By means of a shoulder 11" of the fixed internal-geared wheel 11, which shoulder is provided further outward radially with regard to the depression 11', an annular receptacle for a bearing bushing 21 is formed, and this bearing bushing is inserted into the fixed internal-geared wheel 11 during the assembly. A second, output-end internal-geared wheel 22 having an annular projection 22' is pressed into the bearing bushing 21. The output-end internal-geared wheel 22 is thereby mounted rotatably relative to the fixed internal-geared wheel 11. An internal toothing is formed on the radially inner surface of the projection 22'. The internal toothing on the radially inner surface of the projection 22' has a somewhat smaller diameter than the internal toothing of the fixed internal-geared wheel 11. The pinion 18 is arranged with its second section 18" entirely in the output-end internal-geared wheel 22, in the internal space defined by the annular projection 22', and is in toothed engagement with the internal toothing thereof.

A front clip 24, which is connected at the front to the output-end internal-geared wheel 22, fits over part of the front region of the fixed internal-geared wheel 11 and keeps the two internal-geared wheels 11 and 22 in contact with a sliding element positioned in between. A rear clip 27, which is connected at the rear to the fixed internal-geared wheel 11, fits partially over the rear region of the output-end internal-geared wheel 22 and keeps the two internal-geared wheels 11 and 22 in contact with a sliding element positioned in between. The fixed internal-geared wheel 11 and the output-end internal-geared wheel 22 are held together in the axial direction by the two clips 24 and 27. Rotation of a shaft 30, which is inserted in a rotationally fixed manner in the eccentric 14, by means of a handwheel 32 causes the pinion 18 to move eccentrically relative to the fixed internal-geared wheel 11, with the result that it runs along the fixed internal-geared wheel 11. As a result, the pinion 18 simultaneously rotates the output-end internal-geared wheel 22 relative to the fixed internal-geared wheel 11, so that the geared fitting 1 as a whole executes a pivoting movement.

In the exemplary embodiment, the bearing bushing 21 which is provided according to the invention is produced from steel and is provided with a PTFE (polytetrafluoroethylene) layer. The bearing bushing 21 has an axially extending body 21' having a regular polygon as the cross section and, on the end side facing the output-end internal-geared wheel 22, a flange 21" which protrudes radially outward from the body 21'. The flange 21" keeps the two internal-geared wheels 11 and 22 at a small distance from each other in the axial direction while the body 21' is designed for the reduction of the bearing clearance between the two internal-geared wheels 11 and 22. The polygonal cross section enables the body 21' of the bearing bushing 21 to bear with the corners against the fixed internal-geared wheel 11 which describes the outer circle of the polygon, and with the side centers against the output-end internal-geared wheel 22, which describes the inner circle of the polygon. The bearing therefore takes place in each case with a line contact over a short axial section.

During the pressing in of the output-end internal-geared wheel 22, this polygonal shape enables the formation of a clearance-reducing prestress which causes a defined moment of friction. The bearing bushing 21 is thereby adjusted to the respective tolerances of the two internal-geared wheels 11 and 22. When the two internal-geared wheels 11 and 22 are rotated, the steel side of the bearing bushing 21 is carried along by the associated internal-geared wheel under a frictional connection while the PTFE-coated side slides along the associated internal-geared wheel.

In a modified form, the cross section of the bearing bushing has, as a basic shape, a circle over whose circumference a sinusoidal wave is embossed (undulating bearing bushing). This rounded polygon displays the same properties. In further modified forms, the bearing bushing is formed without a flange. A relatively great prestress can then be built up by the polygonal or undulating body.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A geared fitting for a vehicle seat adjuster, comprising:
   central gear wheels including a first internal-geared wheel and a second internal-geared wheel, wherein the first internal-geared wheel extends at least partially around an axis of the geared fitting and the second internal-geared wheel is mounted on the first internal-geared wheel by a bearing bushing that is positioned between the first and second internal-geared wheels, so that the second internal-geared wheel extends at least partially around the axis and is capable of rotating relative to the first internal-geared wheel; and
   at least one revolving planet wheel which is positioned between and in engagement with the first and second internal-geared wheels,
   wherein said bearing bushing is positioned radially outwardly of the planet wheel, and
   wherein said bearing bushing is an undulating and/or polygonal bearing bushing.

2. A geared fitting according to claim 1, wherein a radial direction extends radially from the axis, said bearing bushing is positioned in a radially extending receptacle that is at least partially defined between a first surface of one of the internal-geared wheels and a second surface of the other of the internal-geared wheels, the first and second surfaces are both positioned radially distant from the axis and engage said bearing bushing, the first surface is positioned between the receptacle and the axis, and the receptacle is positioned between the second surface and the axis.

3. A geared fitting according to claim 2, wherein the axis extends in an axial direction and said bearing bushing has a body which extends in the axial direction and can be deformed in the radial direction.

4. A geared fitting according to claim 3, wherein the body bears at least partially against the internal-geared wheels with line contact.

5. A geared fitting according to claim 4, wherein the body defines a regular polygonal shape in a cross section of the body.

6. A geared fitting according to claim 5, wherein the body defines a circle with an embossed wave shape in the cross section.

7. A geared fitting according to claim 4, wherein the body bears under prestress against the first and second internal-geared wheels.

8. A geared fitting according to claim 1, wherein a radial direction extends radially from the axis and the axis extends in an axial direction, and wherein the bearing bushing has a flange which extends in the radial direction and spaces at least portions of the first and second internal-geared wheels apart from one another by a predetermined distance that extends in the axial direction.

9. A geared fitting according to claim 1, wherein the geared fitting is in combination with the vehicle seat, the vehicle seat includes an inclination adjuster, and the geared fitting is part of the inclination adjuster.

10. A geared fitting according to claim 5, wherein the body bears under prestress against the first and second internal-geared wheels.

11. A geared fitting according to claim 6, wherein the body bears under prestress against the first and second internal-geared wheels.

12. A geared fitting according to claim 2, wherein the axis extends in an axial direction, and wherein the bearing bushing has a flange which extends in the radial direction and spaces at least portions of the first and second internal-geared wheels apart from one another by a predetermined distance that extends in the axial direction.

13. A geared fitting according to claim 3, wherein the bearing bushing has a flange which extends in the radial direction and spaces at least portions of the first and second internal-geared wheels apart from one another by a predetermined distance that extends in the axial direction.

14. A geared fitting according to claim 4, wherein the bearing bushing has a flange which extends in the radial direction and spaces at least portions of the first and second internal-geared wheels apart from one another by a predetermined distance that extends in the axial direction.

15. A geared fitting according to claim 5, wherein the bearing bushing has a flange which extends in the radial direction and spaces at least portions of the first and second internal-geared wheels apart from one another by a predetermined distance that extends in the axial direction.

16. A geared fitting according to claim 6, wherein the bearing bushing has a flange which extends in the radial direction and spaces at least portions of the first and second internal-geared wheels apart from one another by a predetermined distance that extends in the axial direction.

17. A geared fitting according to claim 7, wherein the bearing bushing has a flange which extends in the radial direction and spaces at least portions of the first and second internal-geared wheels apart from one another by a predetermined distance that extends in the axial direction.

18. A geared fitting according to claim 4, wherein the geared fitting is in combination with the vehicle seat, the vehicle seat includes an inclination adjuster, and the geared fitting is part of the inclination adjuster.

19. A geared fitting according to claim 18, wherein the geared fitting is in combination with the vehicle seat, the vehicle seat includes an inclination adjuster, and the geared fitting is part of the inclination adjuster.

20. A geared fitting for a vehicle seat adjuster, comprising:
central gear wheels including a first internal-geared wheel and a second internal-geared wheel, wherein the first internal-geared wheel extends at least partially around an axis of the geared fitting and the second internal-geared wheel is mounted on the first internal-geared wheel by a bearing bushing that is positioned between an annular receptacle of the first internal-geared wheel and an annular projection of the second internal-geared wheel, so that the second internal-geared wheel extends at least partially around the axis and is capable of rotating relative to the first internal-geared wheel, and wherein the bearing bushing engages both the receptacle and the projection, the receptacle is positioned radially outwardly of a portion of the first internal-geared wheel, and the projection is positioned radially outwardly of a portion of the second internal-geared wheel; and
at least one revolving planet wheel which is positioned between and in engagement with the first and second internal-geared wheels,
wherein said bearing bushing is an undulating and/or polygonal bearing bushing.

21. A geared fitting according to claim 20, wherein at least some of the bearing bushing is positioned radially outwardly of the projection, and the receptacle is positioned radially outwardly of at least some of the bearing bushing.

22. A geared fitting according to claim 20, wherein said bearing bushing is positioned radially outwardly of the planet wheel.

* * * * *